United States Patent
Zhang et al.

(10) Patent No.: US 10,713,610 B2
(45) Date of Patent: Jul. 14, 2020

(54) METHODS AND SYSTEMS FOR OCCLUSION DETECTION AND DATA CORRECTION FOR CONTAINER-FULLNESS ESTIMATION

(71) Applicant: SYMBOL TECHNOLOGIES, LLC, Lincolnshire, IL (US)

(72) Inventors: Yan Zhang, Buffalo Grove, IL (US); Jay J. Williams, Glenview, IL (US); Cuneyt M. Taskiran, Chicago, IL (US); Kevin J. O'Connell, Palatine, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/978,367

(22) Filed: Dec. 22, 2015

(65) Prior Publication Data

US 2017/0178333 A1 Jun. 22, 2017

(51) Int. Cl.
*G06T 7/00* (2017.01)
*G06Q 10/08* (2012.01)
*G06T 7/12* (2017.01)

(52) U.S. Cl.
CPC ......... *G06Q 10/083* (2013.01); *G06T 7/0004* (2013.01); *G06T 7/12* (2017.01); *G06T 2207/10021* (2013.01); *G06T 2207/10028* (2013.01); *G06T 2207/20021* (2013.01)

(58) Field of Classification Search
CPC ......... H04N 2013/0081; H04N 19/119; H04N 13/0022; G06T 7/50; G06K 9/36; G06K 9/00208; G06F 3/04815
See application file for complete search history.

(56) References Cited

U.S. PATENT DOCUMENTS

| | | |
|---|---|---|
| 4,408,782 A | 10/1983 | Condon |
| 5,430,831 A | 7/1995 | Snellen |
| 5,474,083 A | 12/1995 | Church et al. |
| 6,269,175 B1 * | 7/2001 | Hanna ............... G06T 5/50 382/107 |
| 6,332,098 B2 | 12/2001 | Ross et al. |
| 6,744,436 B1 | 6/2004 | Chirieleison, Jr. et al. |
| 7,455,621 B1 | 11/2008 | Anthony |

(Continued)

FOREIGN PATENT DOCUMENTS

| | | |
|---|---|---|
| DE | 10050385 A1 | 4/2002 |
| EP | 2178035 A1 | 4/2010 |

(Continued)

OTHER PUBLICATIONS

Simulate point clouds of packages loaded in trailers: http://bl.ocks.org.michael-groble/4588547, Jan. 21, 2013.

(Continued)

*Primary Examiner* — Iman K Kholdebarin
(74) *Attorney, Agent, or Firm* — Yuri Astvatsaturov

(57) ABSTRACT

A method and apparatus for receiving a depth frame from a depth sensor oriented towards an open end of a shipping container, the depth frame comprising a plurality of grid elements that each have a respective depth value, identifying one or more occlusions in the depth frame, correcting the one or more occlusions in the depth frame using one or more temporally proximate depth frames, and outputting the corrected depth frame for fullness estimation.

17 Claims, 10 Drawing Sheets

(56) References Cited

U.S. PATENT DOCUMENTS

| | | | |
|---|---|---|---|
| 7,667,596 B2 | 2/2010 | Ozdemir et al. | |
| 7,961,910 B2 | 6/2011 | Lee et al. | |
| 8,269,616 B2 | 9/2012 | Uehara | |
| 8,346,056 B2 | 1/2013 | M | |
| 9,460,524 B1* | 10/2016 | Curlander | G06Q 10/08 |
| 10,185,877 B2* | 1/2019 | Pournaghi | G06K 9/00718 |
| 2002/0150294 A1 | 10/2002 | Cave et al. | |
| 2003/0036935 A1 | 2/2003 | Nel | |
| 2004/0066500 A1 | 4/2004 | Gokturk et al. | |
| 2004/0125217 A1 | 7/2004 | Jesson | |
| 2005/0199782 A1 | 9/2005 | Calver | |
| 2006/0056679 A1 | 3/2006 | Redert | |
| 2006/0061566 A1 | 3/2006 | Verma et al. | |
| 2006/0239558 A1 | 10/2006 | Rafii et al. | |
| 2007/0016538 A1 | 1/2007 | Bielefeld et al. | |
| 2007/0025593 A1 | 1/2007 | Haupt et al. | |
| 2007/0075853 A1 | 4/2007 | Griffin | |
| 2007/0297560 A1 | 12/2007 | Song | |
| 2008/0025565 A1 | 1/2008 | Zhang | |
| 2008/0042865 A1 | 2/2008 | Shephard et al. | |
| 2008/0201116 A1 | 8/2008 | Ozdemir et al. | |
| 2008/0204225 A1 | 8/2008 | Kitchen | |
| 2008/0303897 A1 | 12/2008 | Twitchell, Jr. | |
| 2009/0121017 A1 | 5/2009 | Cato et al. | |
| 2009/0135009 A1 | 5/2009 | Little et al. | |
| 2010/0073476 A1 | 3/2010 | Liang et al. | |
| 2010/0110185 A1 | 5/2010 | Tafazoli Bilandi | |
| 2010/0161170 A1 | 6/2010 | Siris | |
| 2010/0213313 A1 | 8/2010 | Reed | |
| 2010/0268675 A1 | 10/2010 | Baldes et al. | |
| 2011/0264303 A1 | 10/2011 | Lenser | |
| 2012/0155743 A1* | 6/2012 | Kim | G06T 5/50 382/154 |
| 2012/0163723 A1 | 6/2012 | Balan et al. | |
| 2012/0243774 A1* | 9/2012 | Chen | G06T 15/205 382/154 |
| 2012/0283868 A1 | 11/2012 | Rutt | |
| 2013/0136338 A1* | 5/2013 | Asente | G06K 9/46 382/154 |
| 2013/0293539 A1 | 11/2013 | Hunt | |
| 2013/0342653 A1 | 12/2013 | McCloskey | |
| 2014/0055446 A1* | 2/2014 | Corral-Soto | H04N 13/261 345/419 |
| 2014/0055560 A1* | 2/2014 | Fu | H04N 13/0022 348/42 |
| 2014/0118716 A1* | 5/2014 | Kaganovich | G01S 17/89 356/4.01 |
| 2014/0123606 A1 | 5/2014 | Ehrat | |
| 2014/0247261 A1 | 9/2014 | Lenser | |
| 2014/0350719 A1 | 11/2014 | Fleischmann | |
| 2014/0372182 A1 | 12/2014 | Groble et al. | |
| 2014/0372183 A1 | 12/2014 | Groble et al. | |
| 2015/0170256 A1 | 6/2015 | Pettyjohn | |
| 2015/0248765 A1* | 9/2015 | Criminisi | G06T 7/50 382/106 |
| 2015/0332075 A1 | 11/2015 | Burch | |
| 2016/0238374 A1 | 8/2016 | Burch et al. | |
| 2016/0238425 A1 | 8/2016 | Burch et al. | |
| 2016/0239790 A1 | 8/2016 | Burch et al. | |
| 2016/0239791 A1 | 8/2016 | Burch et al. | |
| 2016/0239792 A1 | 8/2016 | Burch et al. | |
| 2016/0239795 A1 | 8/2016 | Burch et al. | |
| 2016/0239799 A1 | 8/2016 | Burch et al. | |
| 2016/0239801 A1 | 8/2016 | Burch et al. | |
| 2016/0239802 A1 | 8/2016 | Burch et al. | |
| 2017/0140550 A1 | 5/2017 | Zhang et al. | |

FOREIGN PATENT DOCUMENTS

| | | | |
|---|---|---|---|
| EP | 2302564 A1 | 3/2011 | |
| GB | 1010162 A | 11/1965 | |

OTHER PUBLICATIONS

International Search Report & Written Opinion for corresponding International Patent Application No. PCT/US2016/061279 dated Apr. 4, 2017.

Extended Search Report for European Patent Application No. 14737390.6 dated Oct. 24, 2017.

* cited by examiner

METHODS AND SYSTEMS FOR OCCLUSION DETECTION AND DATA CORRECTION FOR CONTAINER-FULLNESS ESTIMATION

BACKGROUND OF THE INVENTION

Efficient loading of containers is a key element to successful distribution in the transportation and logistics industry. Ensuring that each container is loaded efficiently throughout the loading process is vital to successful distribution. However, the inability to verify that each container meets this goal has been a problem in the industry.

There is a need for real-time monitoring or measurements of the containers during the loading process. This functionality could provide good business value to vendors through loading optimization.

Accordingly, there is a need for methods and systems for automatic fullness estimation of containers, and for detecting—and correcting for—occlusions to maintain an accurate fullness estimation of the containers.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
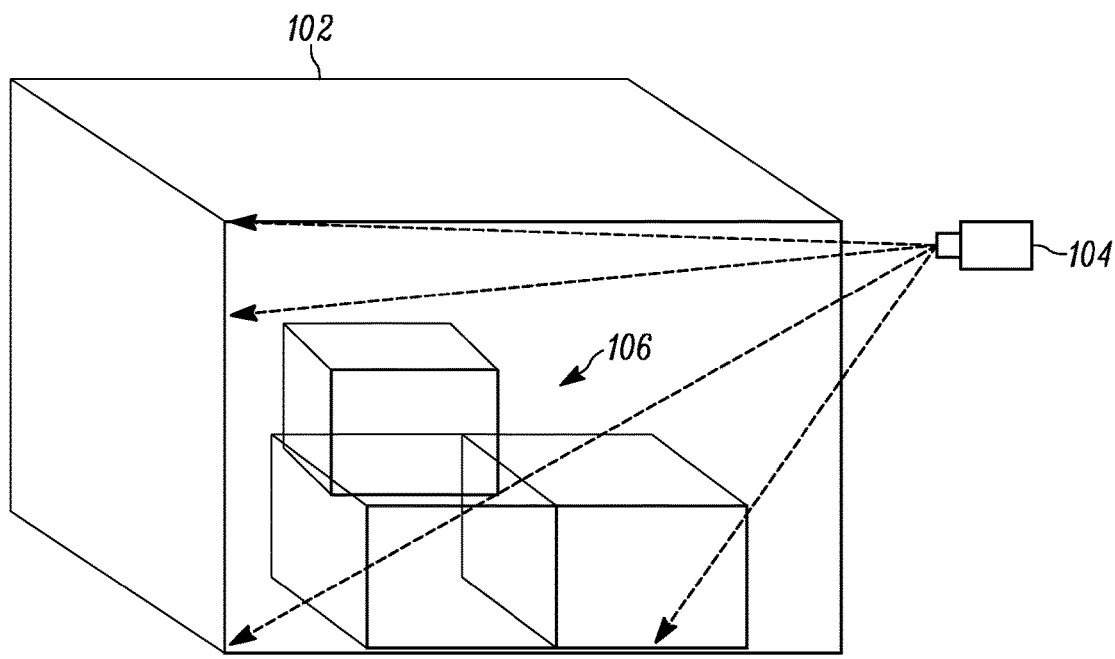
FIG. 1 depicts a shipping container, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment takes the form of a method that includes receiving a depth frame from a depth sensor oriented towards an open end of a shipping container, where the depth frame is projected to a 2D grid map which includes a plurality of grid elements that each have a respective depth value; identifying one or more occlusions in the depth frame; correcting the one or more occlusions in the depth frame using one or more temporally proximate depth frames; and outputting the corrected depth frame for fullness estimation.

In some embodiments, the one or more occlusions includes a missing-data occlusion. In some embodiments, identifying the missing-data occlusion includes (i) generating a binarization map delineating between (a) grid elements for which the respective depth value is valid and (b) grid elements for which the respective depth value is not valid and (ii) identifying the missing-data occlusion as a cluster of grid elements in the binarization map for which the respective depth value is not valid. In some embodiments, identifying the missing-data occlusion further includes confirming that the identified cluster of grid elements exceeds a predetermined occlusion-size threshold. In some embodiments, identifying the missing-data occlusion further includes performing edge detection on the cluster of grid elements. In some embodiments, identifying the missing-data occlusion further includes performing contour identification on the cluster of grid elements.

In some embodiments, the one or more occlusions includes a moving occlusion. In some embodiments, the moving occlusion is associated with a single grid element in the plurality of grid elements. In some embodiments, identifying the moving occlusion includes identifying a threshold depth change in the single grid element between the depth frame and at least one temporally proximate depth frame. In some embodiments, identifying the moving occlusion includes identifying that the depth value associated with the single grid element decreases with respect to previous frames and then increases in succeeding frames in less than a threshold amount of time across multiple depth frames.

In some embodiments, the one or more occlusions includes a discontinuous occlusion. In some embodiments, identifying the discontinuous occlusion includes identifying a cluster of grid elements having a collective depth value that is more than a threshold difference less than a depth value of a loaded-portion boundary of the shipping container. In some embodiments, identifying the discontinuous occlusion includes confirming that the identified cluster of grid elements exceeds a predetermined occlusion-size threshold. In some embodiments, identifying the discontinuous occlusion further includes performing edge detection on the cluster of grid elements. In some embodiments, identifying the discontinuous occlusion further includes performing contour identification on the cluster of grid elements.

In some embodiments, the grid elements are pixels. In some embodiments, the grid elements are groups of pixels.

In some embodiments, the one or more identified occlusions corresponds to an occlusion set of the grid elements in the depth frame, and correcting the one or more occlusions in the depth frame using one or more temporally proximate depth frames includes overwriting the occlusion set in the depth frame with data from corresponding non-occluded grid elements from one or more of the temporally proximate depth frames.

In some embodiments, identifying the one or more occlusions includes analyzing a buffer of depth frames, where the buffer includes the received depth frame.

One embodiment takes the form of a system that includes a depth sensor oriented towards an open end of a shipping container, a communication interface, a processor, and data storage containing instructions executable by the processor for causing the system to carry out a set of functions, where the set of functions includes: receiving a depth frame from the depth sensor, where the depth frame includes a plurality of grid elements that each have a respective depth value; identifying one or more occlusions in the depth frame; correcting the one or more occlusions in the depth frame using one or more temporally proximate depth frames; and outputting the corrected depth frame for fullness estimation.

Moreover, any of the variations and permutations described herein can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseam in this detailed description.

FIG. 1 depicts a shipping container, in accordance with some embodiments. In particular, FIG. 1 depicts (i) a shipping container 102 and (ii) a depth sensor 104 that is oriented towards an open end of the shipping container 102. In various different examples, the shipping container 102 could be designed for travel by truck, rail, boat, plane, and/or any other suitable mode or modes of travel. Moreover, as is more fully discussed herein, the shipping container 102 could have any of a number of different shapes; a substantially rectangular shape (i.e., a rectangular cylinder) is depicted by way of example in FIG. 1. As depicted in FIG. 1, the shipping container 102 contains objects (e.g., boxes and/or other packages) 106. The shipping container 102 may have a number of different surfaces, perhaps flat, perhaps curved, among numerous other possibilities that could be listed here.

There are a number of types of depth sensor 104 that could be used, perhaps one that includes an RGB sensor, perhaps leap motion, perhaps Intel perceptual computing, perhaps Microsoft Kinect, among numerous other possibilities that could be listed here. There are also a number of depth-sensing techniques that could be implemented by the depth sensor 104, perhaps using stereo triangulation, perhaps using time of flight, perhaps using coded aperture, among numerous other possibilities that could be listed here. As one example, the depth sensor 104 could be mounted to a wall or column or the like in a given shipping warehouse, and the shipping container 102 could be positioned on the back of a truck, and then driven (e.g., backed) into a position such that the depth sensor 104 is oriented towards an open end of the shipping container 102, as is depicted in FIG. 1.

Figure 2A:
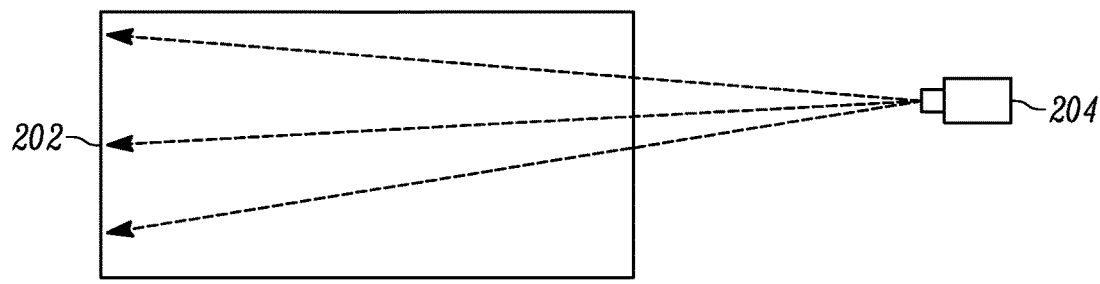
FIG. 2A depicts a flat back surface of a shipping container, in accordance with some embodiments.
Figure 2B:
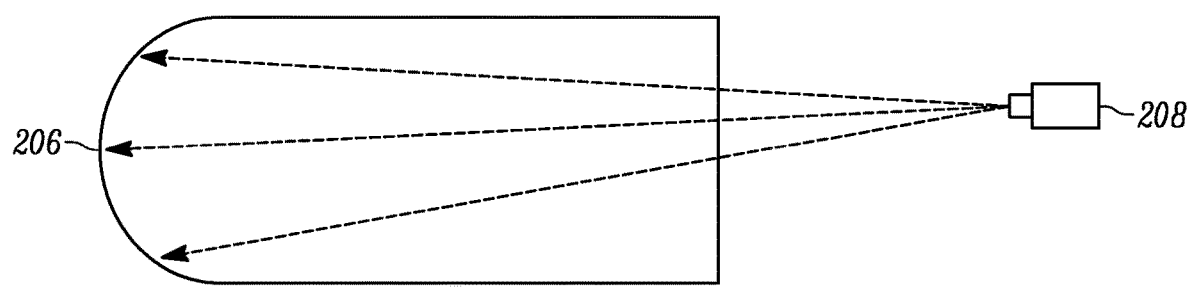
FIG. 2B depicts a curved back surface of a shipping container, in accordance with some embodiments.

As mentioned above, different shipping containers could have different shapes. Two examples are shown in FIGS. 2A and 2B. In particular, FIG. 2A depicts (i) a flat back wall (i.e., surface) 202 of a shipping container and (ii) a depth sensor 204, whereas FIG. 2B depicts (i) a curved back wall (i.e., surface) 206 of a shipping container and (ii) a depth sensor 208. And certainly numerous other examples of shipping-container shapes could be presented here.

Figure 3:
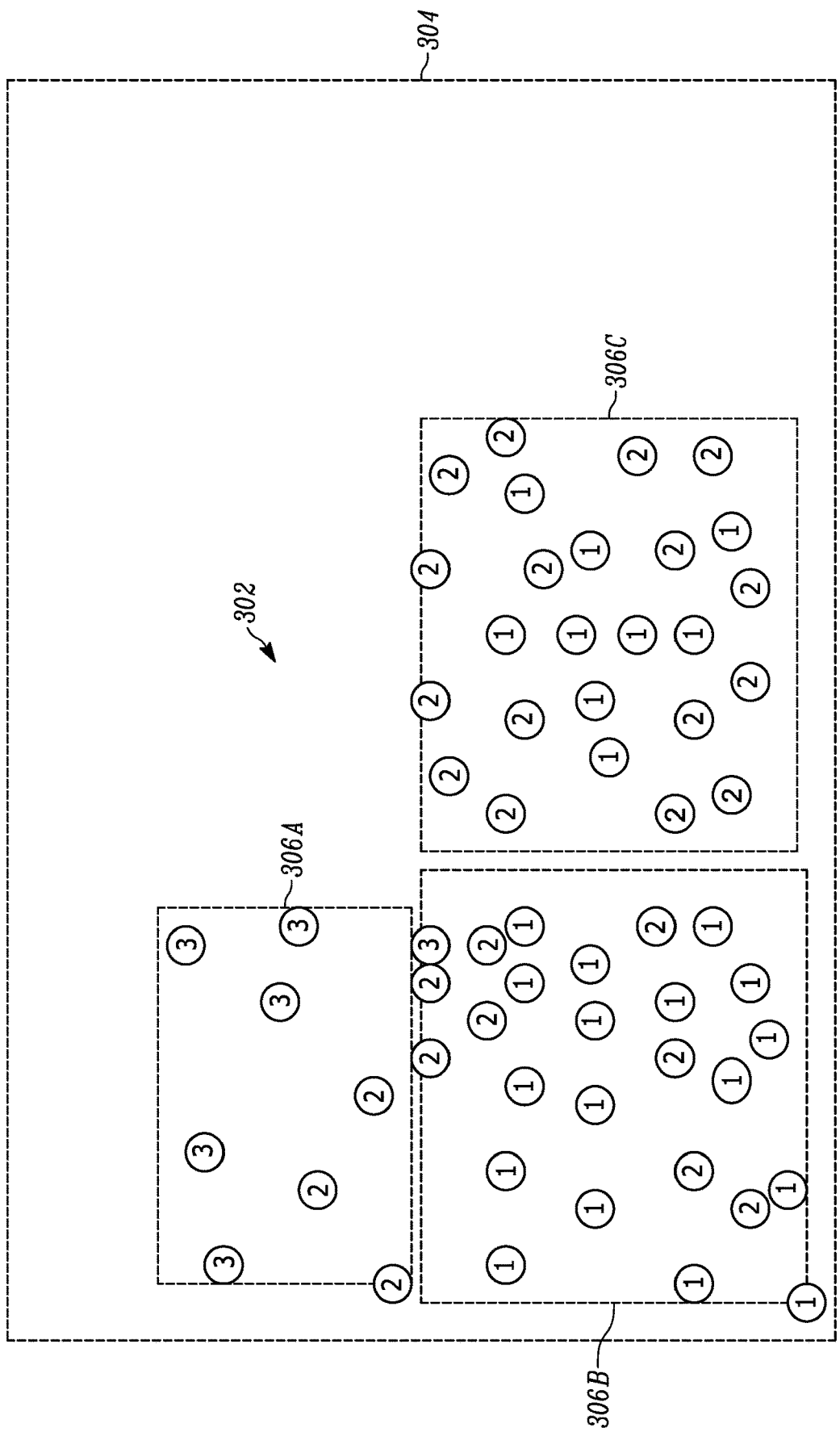
FIG. 3 depicts a loaded-container point cloud, in accordance with some embodiments.

FIG. 3 depicts a loaded-container point cloud, in accordance with some embodiments. In particular, FIG. 3 depicts a 3D point cloud 302. As a general matter, the depth sensor that is oriented at the open end of the shipping container may gather depth information in a given field of view and transmit that information to a system that may be equipped, programmed, and configured to carry out the present systems and methods. That set of information (i.e., points) is referred to herein as being a 3D point cloud (or at times simply a point cloud); each point in such a cloud corresponds to a perceived depth at a corresponding point in the field of view of the depth sensor.

Returning to FIG. 3, an outline 304 of a shipping container is shown, as are outlines 306A, 306B, and 306C of example packages in the example shipping container. These outlines 304 and 306A-C are intended to generally correspond to the shipping container 104 and the packages 106 that are depicted in FIG. 1, in order to help the reader to visualize an example real-world scenario from which the example point cloud 302 could have been derived, gathered, or the like. Moreover, for purposes of illustration, each point in the point cloud 302 is shown in FIG. 3 as having an integer number that corresponds to an example depth value (in, e.g., example units such as meters). In actual implementations, any number of points could be present in the point cloud 302, as the various points that are depicted in FIG. 3 as being part of the point cloud 302 are for illustration and are not meant to be comprehensive.

Moreover, as is more fully discussed below, in some embodiments the depth sensor that is oriented towards an open end of the shipping container has a vantage point with respect to the open end of the shipping container that is not aligned with the center of the open end of the shipping container in one or more dimensions. That is, the depth sensor and the shipping container might be relatively positioned such that the depth sensor is looking to some extent from one side or the other and could be vertically off center (e.g., elevated) as well. So, for example, the depth sensor may be positioned higher and to the right of the center of the plane that corresponds with the open end of the shipping container.

As is more fully described below, the present disclosure includes segmentation and projection of the received point cloud into a number of grid elements in a 2D grid map that collectively correspond to the open end of the shipping container. In cases where the depth sensor happens to be positioned square to the open end of the shipping container and vertically centered on that open end as well, this segmentation and projection step can be proceeded to without first performing one or more geometric rotations. In other cases, however, prior to carrying out the below-described segmentation step and the various other steps that are subsequent to that, the present systems and methods include a step of one or more geometric rotations in accordance with the relative positions of the depth sensor and the open end of the shipping container. Such relative position can be pre-programmed into the system, or could otherwise be determined using depth sensors, optical cameras, and/or other suitable equipment.

Figure 4:
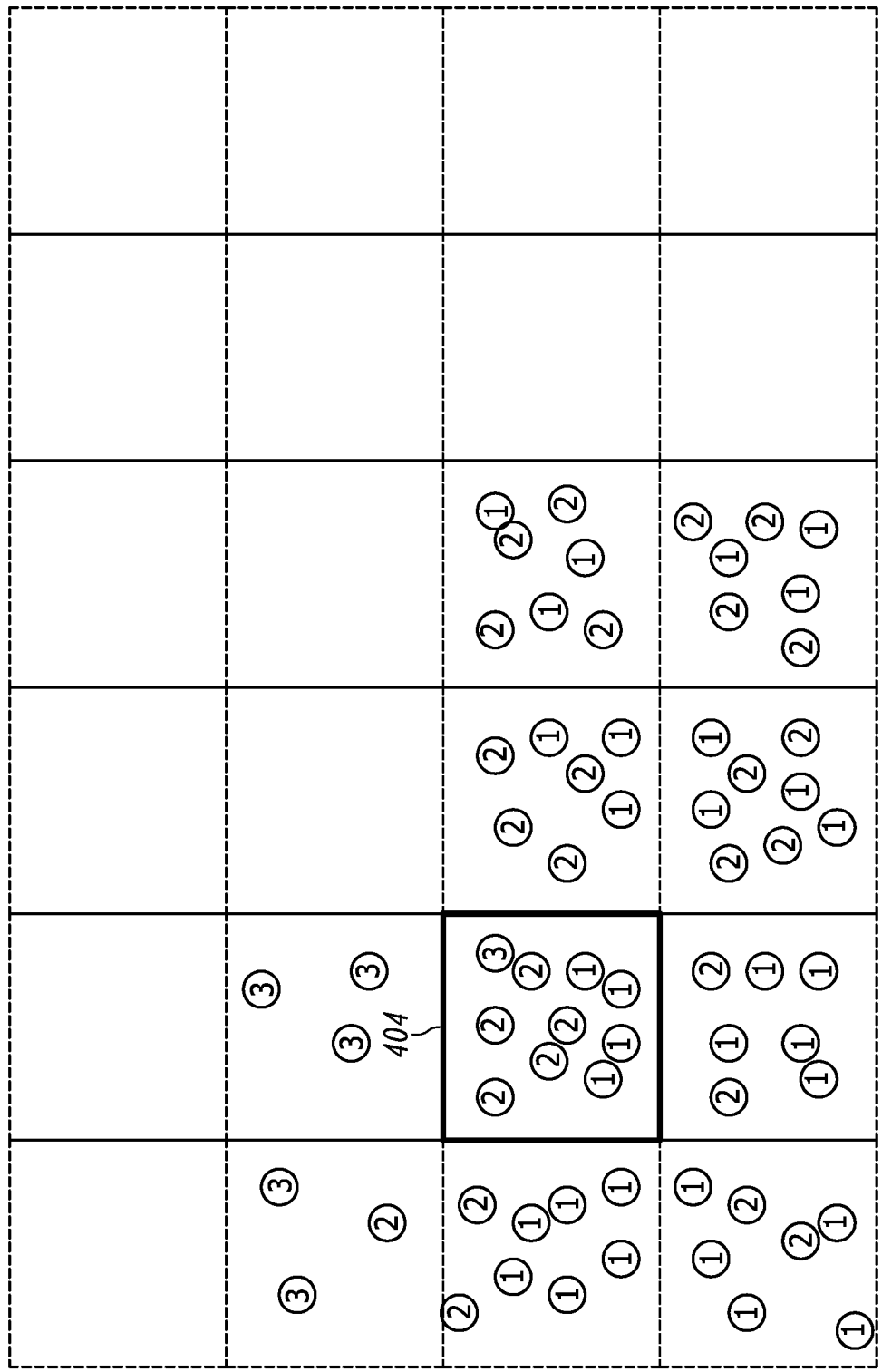
FIG. 4 depicts a segmented loaded-container point cloud, in accordance with some embodiments.

FIG. 4 depicts a segmented loaded-container point cloud, in accordance with some embodiments. In particular, FIG. 4 depicts a segmented 3D point cloud 402, which may be generated in a number of different ways, such as edge-based segmentation, surfaced-based segmentation, and/or scan-line-based segmentation, among numerous other possibilities that may be listed here. Moreover, it is noted that FIG. 4 depicts the segmented point cloud 402 after any necessary rotations were performed to account for the relative positions and alignments of the depth sensor and the open end of the shipping container.

As described above, in at least one embodiment, the point cloud 402 is segmented among a plurality of grid elements, which collectively form a 2D grid image that corresponds to a plane that is parallel to the open end of the shipping container. Each grid element has a respective grid-element area. In FIG. 4, the grid elements are shown as being substantially square (e.g., 5 mm by 5 mm), though this is by way of example and not limitation, as any suitable dimensions and/or shapes could be used as deemed suitable by those of skill in the art for a given implementation. Moreover, in some embodiments, the side length of the grid elements is an adjustable parameter. In some cases, this parameter is set to be as small a value as the associated depth sensor allows and/or is capable of Indeed, the resolution of the depth sensor plays a role in whether estimates of container fullness are overestimates or underestimates. As can be seen in FIG. 4, one example grid element 404 is highlighted by way of example. The grid element 404 is depicted as including ten total points from the segmented point cloud 402; four of those ten points have a depth value of 1 (e.g., 1 meter), five of those ten points have a depth value of 2 (e.g., 2 meters), and one of those ten points has a depth value of 3 (e.g., 3 meters). This number of points in grid element 404 and these respective depth values are provided purely by way of example and for illustration, and in no way for limitation.

Figure 5:
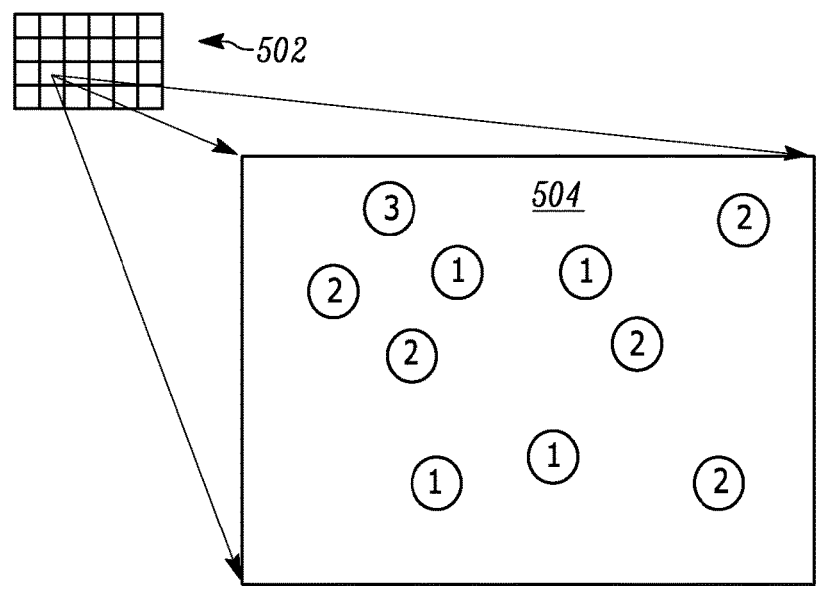
FIG. 5 depicts an expanded-grid-element view of a segmented loaded-container point cloud, in accordance with some embodiments.

FIG. 5 depicts an expanded-grid-element view of a segmented loaded-container point cloud, in accordance with some embodiments. In particular, FIG. 5 depicts a segmented 3D point cloud 502 (though zoomed out too far to depict individual points) and an expanded grid element 504. The expanded grid element 504 includes, by way of example only, the same set of ten points that are in the grid element 404 of FIG. 4, albeit in a different arrangement; i.e., there are ten total points, including four points having a depth value of 1, five points having a depth value of 2, and one point having a depth value of 3.

In connection with various embodiments, the grid element 504 is assigned a characteristic depth value based on the depth values of the points in the subsection of the 3D point cloud that is found in the particular grid element 504. From among those depth values, the characteristic depth value for the grid element could be a minimum value, a mode (i.e., most commonly occurring) value, an average value, or some other possibility. Using the example data that is present in FIG. 5: if the minimum value were used, then the characteristic depth value for the grid element 504 would be 1; if the mode value were used, then the characteristic depth value for the grid element 504 would be 2; if the average value were used, then the characteristic depth value for the grid element 504 would be 1.7 (or 2 if rounded to the nearest whole number). And certainly numerous other possible implementations could be listed here. As is described more fully below, the characteristic depth value that is assigned to a given grid element is then used, along with the area of that grid element, to calculate a loaded-portion volume for that particular grid element.

Figure 6:
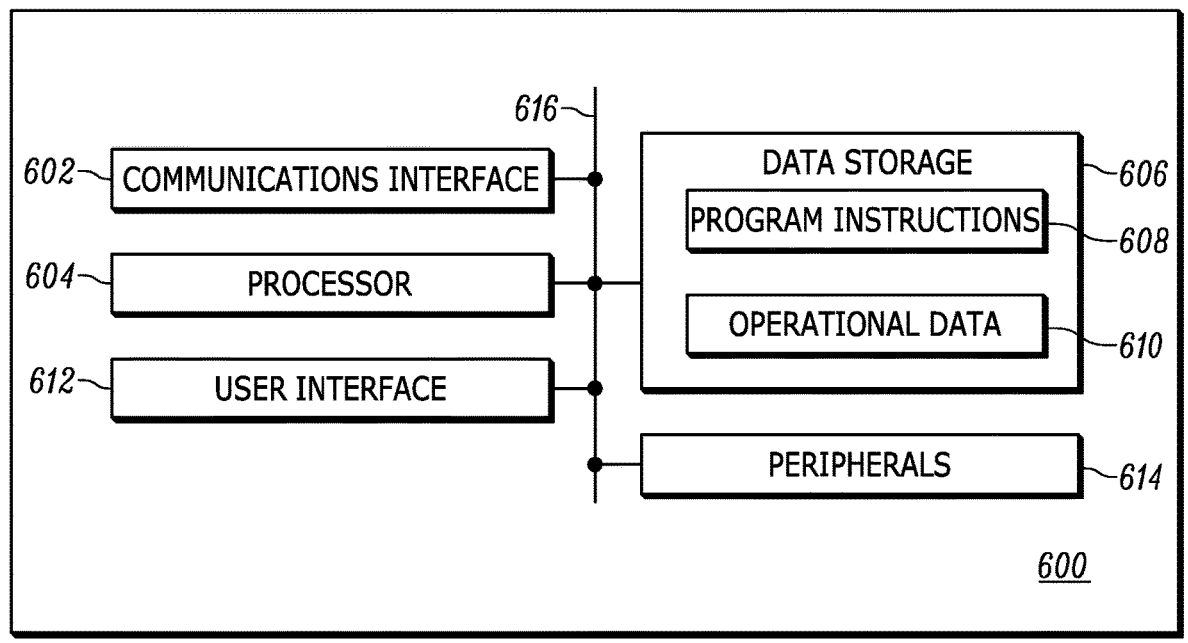
FIG. 6 depicts an architectural view of an example computing device, in accordance with some embodiments.

FIG. 6 depicts an architectural view of an example computing device, in accordance with some embodiments. The example computing device 600 may be configured to carry out the functions described herein, and as depicted includes a communications interface 602, a processor 604, data storage 606 (that contains program instructions 608 and operational data 610), a user interface 612, peripherals 614, and a communication bus 616. This arrangement is presented by way of example and not limitation, as other example arrangements could be described here.

The communication interface 602 may be configured to be operable for communication according to one or more wireless-communication protocols, some examples of which include LMR, LTE, APCO P25, ETSI DMR, TETRA, Wi-Fi, Bluetooth, and the like. The communication interface 602 may also or instead include one or more wired-communication interfaces (for communication according to, e.g., Ethernet, USB, and/or one or more other protocols.) The communication interface 602 may include any necessary hardware (e.g., chipsets, antennas, Ethernet interfaces, etc.), any necessary firmware, and any necessary software for conducting one or more forms of communication with one or more other entities as described herein.

The processor 604 may include one or more processors of any type deemed suitable by those of skill in the relevant art, some examples including a general-purpose microprocessor and a dedicated digital signal processor (DSP).

The data storage 606 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 6, the data storage 606 contains program instructions 608 executable by the processor 604 for carrying out various functions described herein, and further is depicted as containing operational data 610, which may include any one or more data values stored by and/or accessed by the computing device in carrying out one or more of the functions described herein.

The user interface 612 may include one or more input devices (a.k.a. components and the like) and/or one or more output devices (a.k.a. components and the like.) With respect to input devices, the user interface 612 may include one or more touchscreens, buttons, switches, microphones, and the like. With respect to output devices, the user interface 612 may include one or more displays, speakers, light emitting diodes (LEDs), and the like. Moreover, one or more components (e.g., an interactive touchscreen and display) of the user interface 612 could provide both user-input and user-output functionality.

The peripherals 614 may include any computing device accessory, component, or the like, that is accessible to and useable by the computing device 600 during operation. In some embodiments, the peripherals 614 includes a depth sensor. In some embodiments, the peripherals 614 includes a camera for capturing digital video and/or still images. And certainly other example peripherals could be listed.

Figure 7:
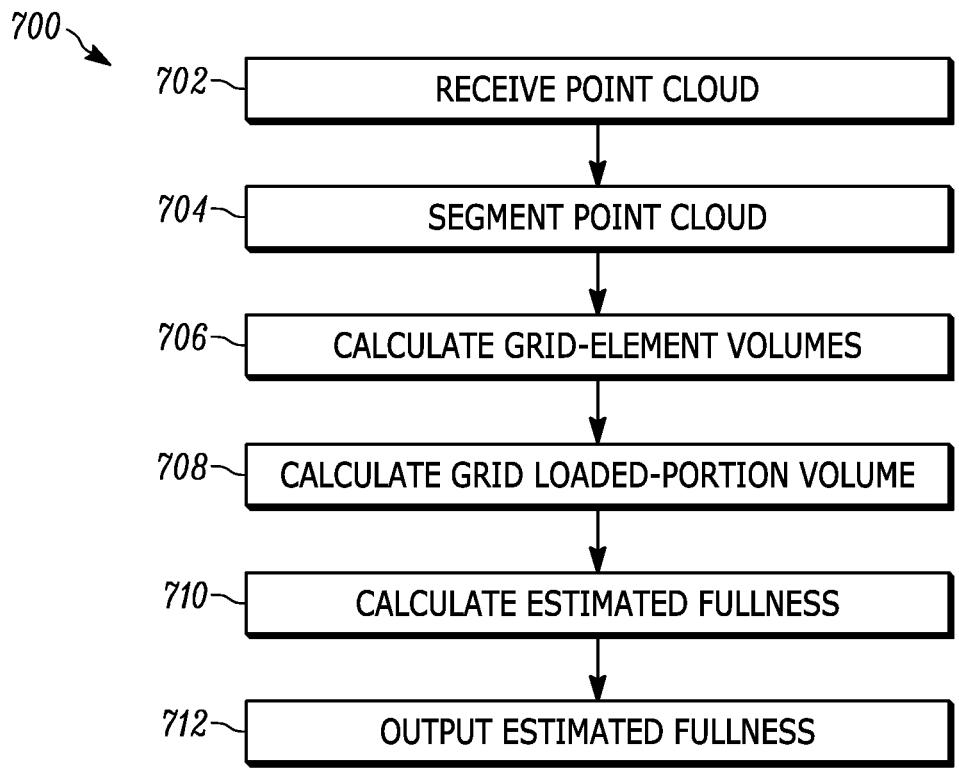
FIG. 7 depicts a first example method, in accordance with some embodiments.

FIG. 7 depicts a first example method, in accordance with some embodiments. In particular, FIG. 7 depicts a method 700 that includes steps 702, 704, 706, 708, 710, and 712, and is described below by way of example as being carried out by the computing system 600 of FIG. 6, though in general the method 700 could be carried out by any computing device that is suitably equipped, programmed, and configured.

At step 702, the computing system 600 receives a 3D point cloud from a depth sensor that is oriented towards an open end of a shipping container. The point cloud includes a plurality of points that each have a respective depth value. As described above, if necessary due to the respective positioning and alignment of the depth sensor and the open end of the shipping container, the computing system 600, upon receiving the 3D point cloud, may rotate the received 3D point cloud to align (i) an optical axis of the depth sensor with a ground level and (ii) an image plane of the depth sensor with an end plane of the shipping container. This rotating of the received point cloud may be based on a calibration process (e.g., an offline calibration process) that uses the ground level and the end plane as reference.

At step 704, the computing system 600 segments the 3D point cloud that was received at step 702 among a plurality of grid elements. As described above, those grid elements could be substantially rectangular (e.g., square) in shape, and they may collectively form a 2D grid image that corresponds to a plane that is parallel to the open end of the shipping container, where each grid element has a respective grid-element area.

At step 706, the computing system 600 calculates a respective loaded-container-portion grid-element volume for each grid element. The computing system 600 may do so by first determining a respective loaded-container-portion grid-element depth value for each grid element, and then determining each respective loaded-container-portion grid-element volume for each grid element by multiplying the particular grid element's area by the particular grid element's respective loaded-container-portion grid-element depth value. In some embodiments, the computing system 600 cleans up the 2D grid image prior to determining a respective loaded-container-portion grid-element depth value for each grid element.

As to how the computing system 600 may determine a particular grid element's respective loaded-container-portion grid-element depth value, in one embodiment the computing system 600 determines an unloaded-container-portion depth value for the particular grid element, and then determines the respective loaded-container-portion grid-element depth value for the particular grid element based at least in part on the difference between (i) a depth dimension of the shipping container and (ii) the determined unloaded-container-portion depth value for the corresponding grid element. Thus, for example, if the computing system 600 determined that the unloaded-container-portion depth value of a given grid element was 3 meters and knew that the depth dimension of the shipping container was 50 meters, the computing system 600 could determine that the loaded-container-portion depth value for the given grid element was 47 meters.

As to how the computing system 600 may determine the unloaded-container-portion depth value for a given grid element, in some embodiments the computing system 600 assigns a characteristic grid-element depth value to the given grid element based on the depth values of the points in the point cloud that correspond to the given grid element. As described above, some options for doing so including selecting a minimum value, a mode value, and an average value. A maximum value could also be selected, though this would tend to lead to underloading of containers by overestimating their fullness, which would be less than optimally efficient.

Upon assigning a characteristic grid-element depth value to the given grid element, the computing system 600 may then determine the respective unloaded-container-portion depth value for the given grid element based at least in part on the difference between (i) the assigned characteristic grid-element depth value for the given grid element and (ii) an offset depth value corresponding to a depth between the 3D depth sensor and a front plane of the shipping container. Thus, if the depth sensor registers an absolute value of, e.g., 7 meters as a depth value for a given point or grid element and it is pre-provisioned or runtime determined that the depth sensor is 4 meters from the front plane of the open end of the shipping container, the computing system 600 may consider the unloaded-container-portion depth value for that grid element to be 3 meters. And certainly numerous other examples could be listed.

In some cases, the depth dimension of the shipping container that is used to derive a loaded-container-portion depth value from an unloaded-container-portion depth value for a given grid element is a grid-element-specific depth dimension that is based on a corresponding grid element in a reference empty-container point cloud. As described above, the back wall could be flat or curved, as depicted in FIGS. 2A and 2B, and the grid-element-specific depth dimension for a given grid element could accordingly reflect this. A reference point cloud could be gathered using an empty shipping container of the same type, and that reference point cloud could be stored in data storage and recalled, perhaps on a grid-element-by-grid-element basis to perform the herein-described calculations.

At step 708, the computing system 600 calculates a loaded-container-portion volume of the shipping container by aggregating the respective loaded-container-portion grid-element volumes that were calculated at step 706, giving a result that corresponds to what volume (in, e.g., cubic meters) of the shipping container has been loaded. It is noted that loaded in this context essentially means no longer available for loading. Thus, empty space that is now inaccessible due to packages being stacked in the way would be counted as loaded right along with space in the shipping container that is actually occupied by a given package.

At step 710, the computing system 600 calculates an estimated fullness of the shipping container based on (i) the loaded-container-portion volume that was calculated at step 708 and (ii) a capacity of the shipping container. In particular, the estimated fullness of the shipping container may be calculated as the loaded-portion volume of the shipping container divided by the capacity of the shipping container. The capacity of the shipping container could be determined in multiple different ways, some of which are described below.

In one embodiment, the computing system 600 determines the capacity of the shipping container based at least in part on the received 3D point cloud. Thus, the 3D point cloud may be indicative of the dimensions of the shipping container such that the capacity of the shipping container can be determined. In another embodiment, the computing system receives an optical image of the shipping container, and determines the capacity of the shipping container based at least in part on the received optical image. This could include determining actual dimensions of the shipping container from the optical image, and could instead or in addition include extracting an identifier of the shipping container from the optical image, perhaps using optical character recognition (OCR), and then querying a local or remote database using that identifier in order to retrieve dimension and/or capacity data pertaining to the particular shipping container.

It is noted that, in some embodiments, the system may determine that the entire interior of the shipping container is not visible to the depth sensor, perhaps due to the relative location and arrangement of the depth sensor and the shipping container. In such instances, the system may define a volume of interest (VOI) as being the part of the interior of the container that is visible to the depth sensor. The system may in some such instances calculate the estimated fullness of the container to be loaded portion of the VOI divided by the capacity (i.e., total volume) of the VOI. In other embodiments, the system may simply assume that any internal portion of the shipping container that cannot be seen with the depth camera is loaded, and in such cases may still calculate the estimated fullness as the loaded portion of the entire shipping container divided by the total capacity of the entire shipping container. And certainly other example implementations could be listed here as well.

At step 712, the computing system 600 outputs the calculated estimated fullness of the shipping container, perhaps to a display, perhaps to a data storage, perhaps using wireless and/or wired communication to transmit the calculated estimated fullness of the shipping container to one or more other devices or systems, and/or perhaps to one or more other destinations.

Figure 8:
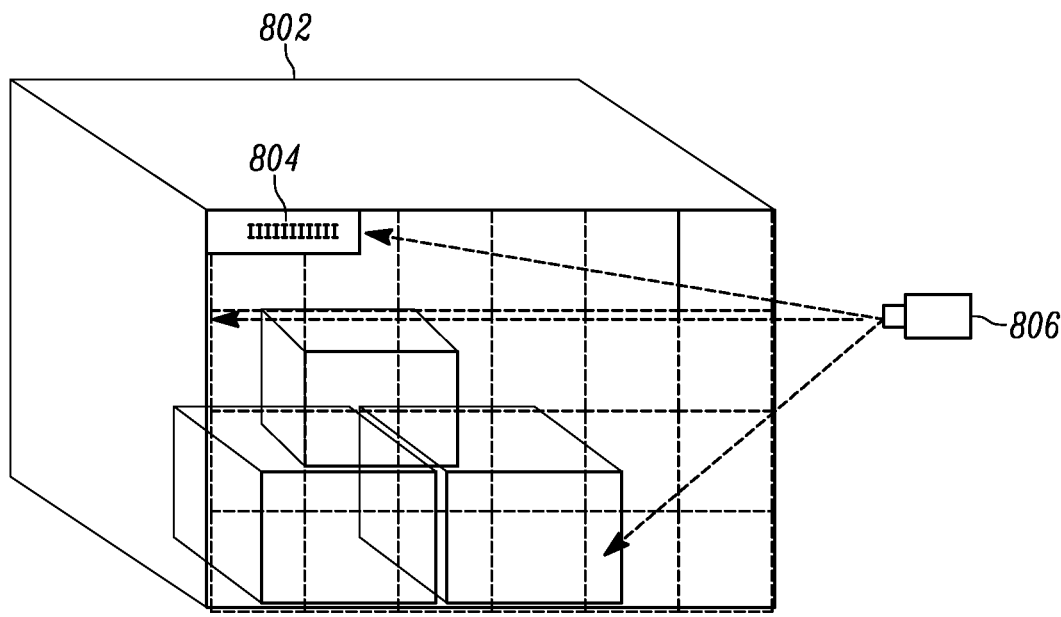
FIG. 8 depicts a shipping container having an optically readable identifier, in accordance with some embodiments.

FIG. 8 depicts a shipping container having an optically readable identifier in accordance with some embodiments. In particular, FIG. 8 depicts a container 802, an indicia 804 (e.g., bar code or alphanumeric identifier), and an optical reader 806. There are several different types of optical readers 806 that may be used, such as a barcode scanner, a camera, and/or the like. In one embodiment, the optical reader 806 acquires an alphanumeric identifier of the container data using OCR. The computing system may then use that acquired alphanumeric identifier of the container to query a database for dimension data pertaining to the shipping container. And certainly other example implementations could be listed here as well.

In some instances, there may be one or more moving or stationary occlusions (e.g., package loaders, stray packages, etc.) between the 3D depth sensor and the loaded portion of the container. Some occlusions cause underestimates of container fullness, perhaps by being so close to the 3D depth sensor so as to create gaps in the point-cloud data. Some occlusions cause overestimates of container fullness, perhaps by being so close to actually loaded packages so as to be confused for (e.g., clustered with) those loaded packages. Thus, as a general matter, unless properly detected and corrected for, the presence of occlusions can result in erroneous estimation of the fullness of the shipping container.

Figure 9:
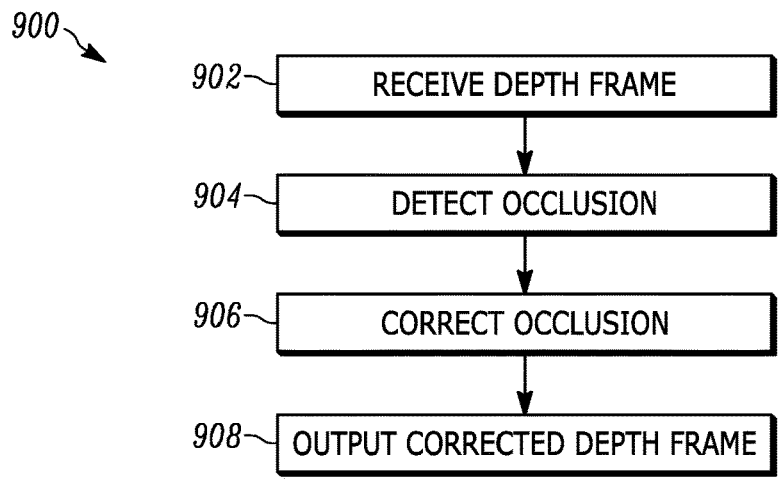
FIG. 9 depicts a second example method, in accordance with some embodiments.

FIG. 9 depicts a second example method, in accordance with some embodiments. In particular, FIG. 9 depicts a method 900, which includes the steps of receiving, at step 902, a depth frame from a depth sensor oriented towards an open end of a shipping container, where the depth frame includes a plurality of grid elements that each have a respective depth value. The method 900 further includes identifying, at step 904, one or more occlusions in the depth frame. In some instances, only one or more far occlusions are detected. In some instances, only one or more close occlusions are detected. In some instances, both far and close occlusions are detected. The method 900 further includes correcting, a step 906, the one or more occlusions in the depth frame using one or more temporally proximate depth frames, and outputting, at step 908, the corrected depth frame for fullness estimation.

Figure 10:
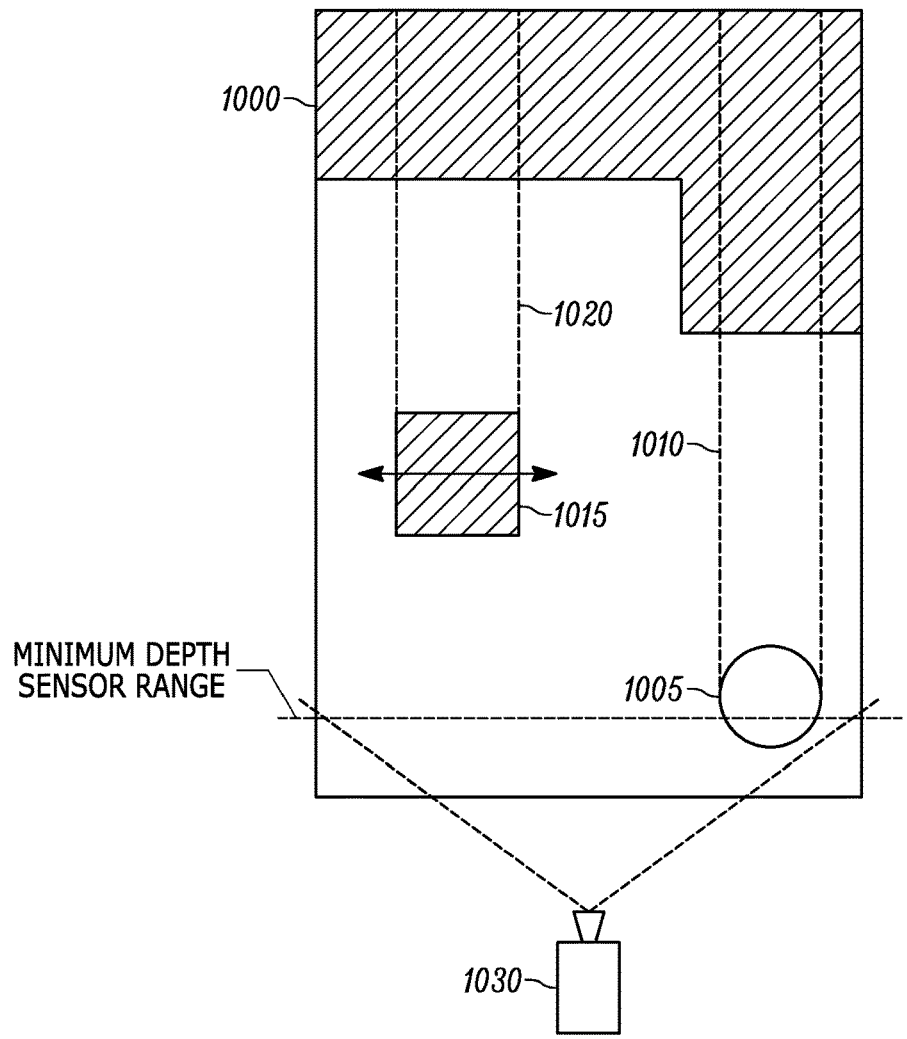
FIG. 10 depicts an example scenario for detecting occlusions in a shipping container, in accordance with some embodiments.

FIG. 10 depicts an example scenario for detecting occlusions in a shipping container, in accordance with some embodiments. In particular, FIG. 10 depicts an example scenario in which a depth sensor 1030 is configured to collect depth data while oriented towards a shipping container 1000. In the example moment of the depicted scenario, there are two occluding objects: a close occluding object 1005 and a far occluding object 1015. As shown, close occlusions may be caused by occluding objects close to depth sensor 1030 (e.g., loaders, unloaded packages, see FIG. 10 object 1005). In some embodiments, close occlusions appear as gaps or holes (no data (or no valid data)) in the 3D depth data, which may result in underestimated fullness, as less than a complete set of 3D depth volume data is processed. As close occlusions often present as gaps in data, they may also be referred to as "missing-data occlusions." As shown, an object 1005 is within the depth sensor's minimum detection range, and the depth sensor may therefore not provide any data for areas blocked by object 1005. This gap in the 3D depth data may cause the system to omit the volume occupied by region 1010 while calculating fullness, thus resulting in an underestimate of the shipping-container fullness. In other embodiments, some depth sensors 1030 may output the minimum range distance for any object detected within the minimum range, which would result in an over-estimation, as the system may assume packages are loaded in region 1010. And certainly other example scenarios could be listed here as well.

Figure 11:
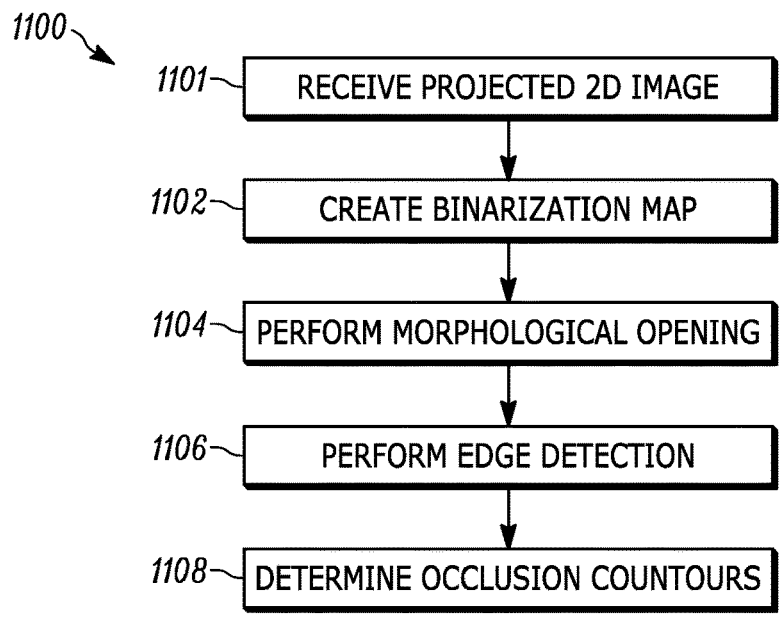
FIG. 11 depicts an example sub-process for detecting close occlusions, in accordance with some embodiments.

In some embodiments, detecting missing-data occlusions includes carrying out sub-process 1100 as shown in FIG. 11. As shown, sub-process 1100 includes the steps of receiving a projected 2D image of grid elements at step 1101 and creating a binarization map at step 1102, performing at least one morphological opening at step 1104, performing edge detection of the at least one morphological opening at step 1106, and determining occlusion contours based on the detected edges at step 1108. In some embodiments, the binarization map delineates between (i) grid elements for which the respective depth value is valid and (ii) grid elements for which the respective depth value is not valid (i.e., a map of valid data points and invalid (e.g., missing) data points). In some embodiments, performing the morphological opening in step 1104 includes identifying a cluster of grid elements in the binarization map for which the respective depth value is invalid. In some embodiments, the identified cluster of grid elements may need to exceed a predetermined occlusion-size threshold of grid elements to be determined to be a morphological opening, and thus a (suspected) close occluding object.

In some embodiments, the edge detection performed at step 1106 may be Canny edge detection. In some embodiments, performing the edge detection at step 1106 may include determining the set of grid elements in the identified cluster that define the edges of the 2D grid image after morphological opening is performed. In some embodiments, this is done on a grid element-by-grid element basis. In some embodiments, the grid elements are single pixels in the point cloud. In some embodiments, the grid elements are groups of pixels, and may be averaged together (or otherwise characterized using a single number, as described above). In some embodiments, determining the occlusion contour at step 1108 includes forming an occlusion mask (including occlusion location, contour length, and a mask image, in some embodiments) based on grid elements that have been identified as edges in the previous step. In some embodiments, the occlusion contours are based on contour length and aspect ratio. Lastly, the occlusion location, contour length, and mask image may be output for occlusion correction (e.g., in step 906 of FIG. 9).

The second type of occluding objects discussed herein are far occluding objects (see, e.g., FIG. 10, object 1015). In some embodiments, far occluding objects may include either or both of two different types of far occlusions: moving occlusions and discontinuous occlusions. Far occlusions may be caused by occluding objects that are further away from depth sensor 1030 (i.e., closer to the loaded packages in the container) as compared with occluding objects that present as what are characterized in this description as being near occlusions. Far occlusions may result in a calculated fullness that is overestimated. In some embodiments, the method for calculating the fullness assumes the shipping container has been loaded from the back to front. Thus, if there is a discontinuous occlusion (e.g., a loader or a package that has not been packed yet), the system may assume that there are packages in the region 1020 behind the occluding object 1015, when in reality some of the space behind the object 1015 may be unoccupied.

Figure 12:
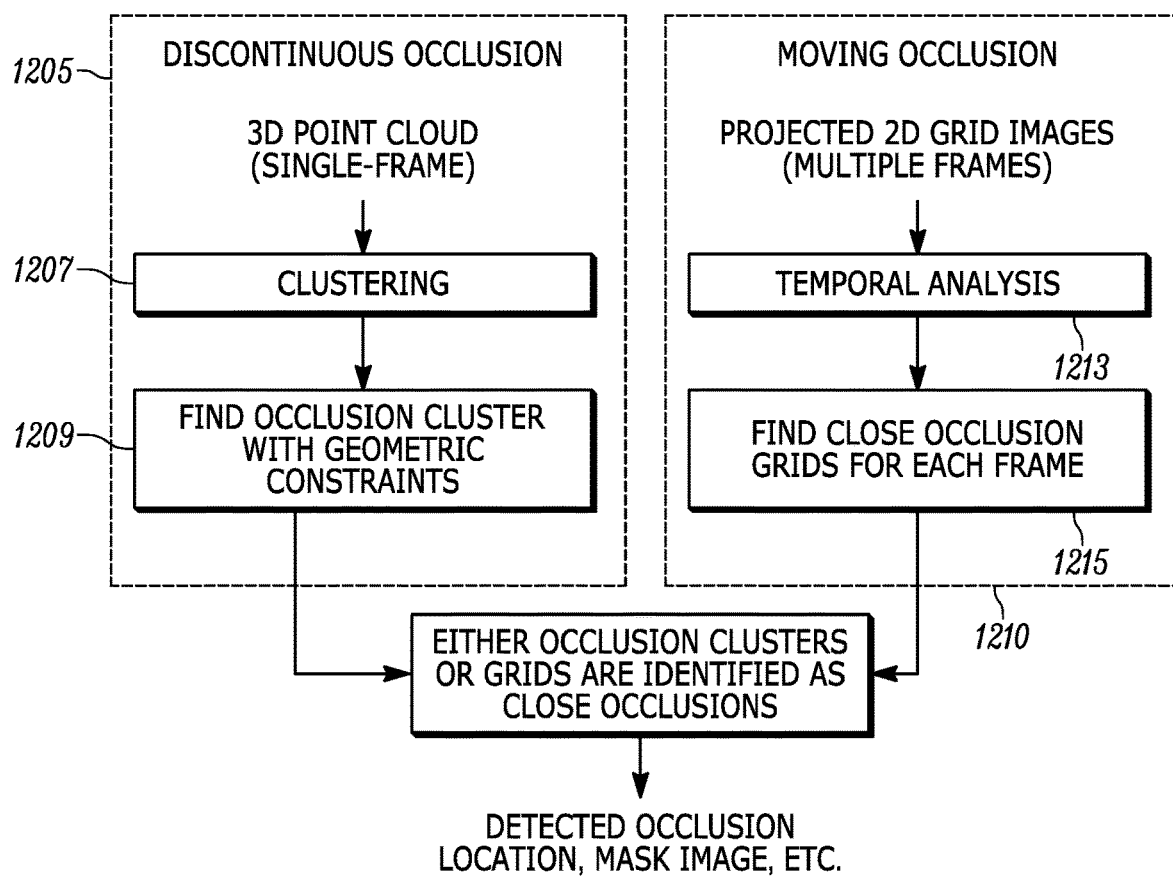
FIG. 12 depicts an example sub-process for detecting far occlusions, in accordance with some embodiments.

FIG. 12 illustrates a sub-process of detecting discontinuous occlusions (generally at 1205) and moving occlusions (generally at 1210).

As mentioned above, in some embodiments, it is assumed that packages are loaded from back to front in the shipping container; and accordingly, in some embodiments, identifying a discontinuous occlusion includes identifying, at step 1207, a cluster of grid elements from a single frame of a 3D point cloud, where the cluster of grid elements has depth values that are more than a threshold difference less than a depth value of a loaded-portion boundary of the shipping container (i.e., the depth values for the loaded packages). In some embodiments, the cluster of discontinuous occluding points is identified using clustering techniques that are commonly know to those of ordinary skill in the art. Similar to identifying close occlusions, in some embodiments, identifying discontinuous occlusions may include finding clusters with location and geometric constraints such as cluster width, length, and aspect ratio in step 1209, and may further involve confirming that the identified cluster of grid elements exceeds a predetermined occlusion-size threshold. In some embodiments, identifying the discontinuous occlusion includes performing edge detection on the cluster of grid elements. In some embodiments, identifying the discontinuous occlusion includes performing contour identification on the cluster of grid elements. In some embodiments, the grid elements are single pixels, while in other embodiments the grid elements are groups of pixels.

In some instances, objects (e.g., a loader) that are close to the loaded packages (i.e., far occlusions) may not be detected in single-frame analysis, and therefore temporal analysis (performed in step 1213) may be used to detect moving occlusions. In some embodiments, the transient nature of a given object may be used in identifying that object as being a moving occlusion. In some embodiments, this transient nature may be perceived as depth values changing too much between two adjacent frames for a given grid element, which may indicate movement instead of a permanently loaded package in the corresponding location. In some embodiments it may be useful to know that, as packages are loaded in the shipping container from back to front, the depth values of the grid elements in the projected 2D image should progressively and consistently decrease from the point of view of the depth sensor, assuming that packages are loaded from back to front. In some embodiments, the temporal analysis step includes identifying that the depth value associated with a single grid element decreases with respect to previous frames and then increases in succeeding frames in less than a threshold amount of time across multiple depth frames, consistent with what would occur if a transient object passed through the field of view of the 3D depth sensor.

Figure 13:
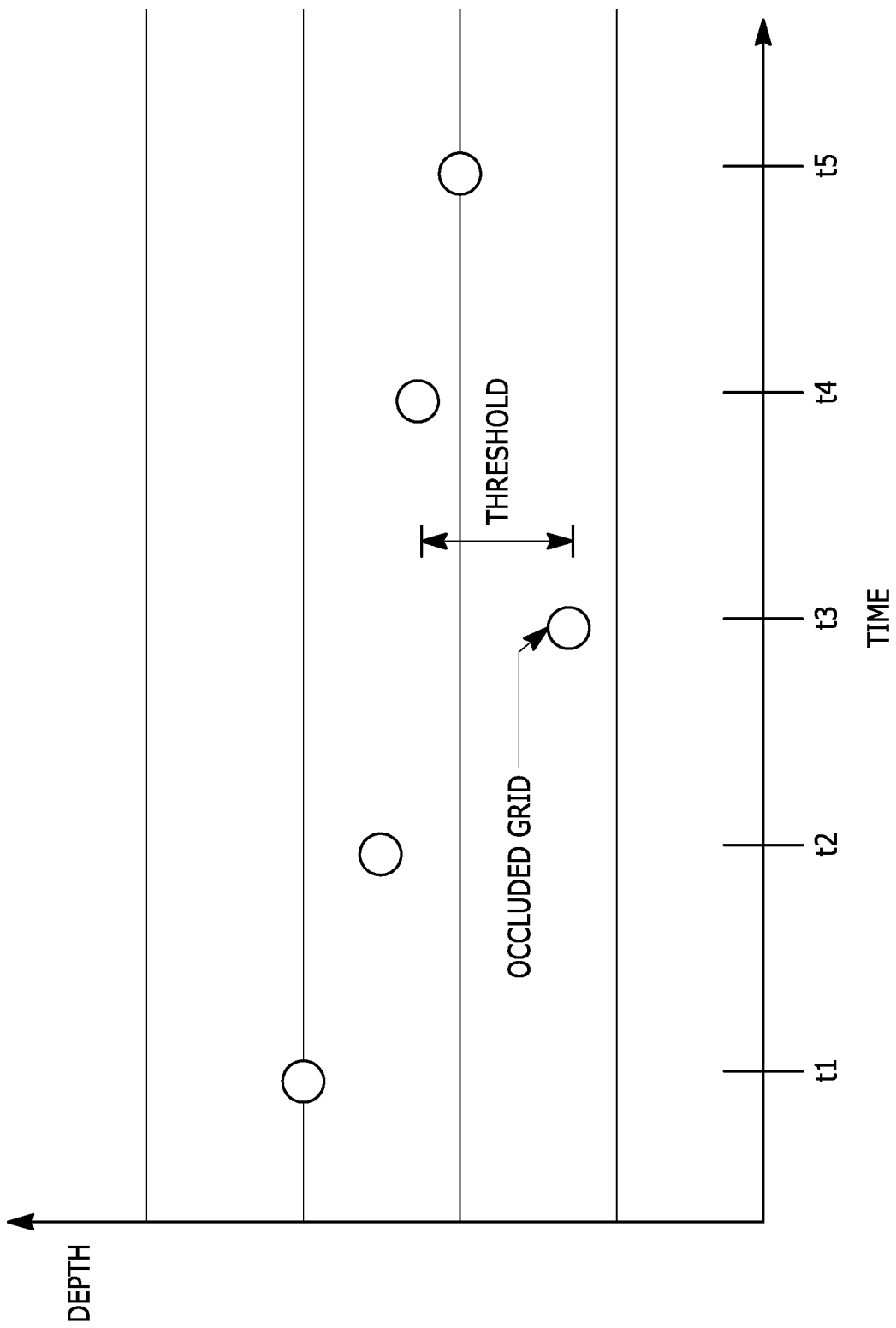
FIG. 13 depicts an example of temporal analysis, in accordance with some embodiments.

FIG. 13 depicts an example of temporal analysis, in accordance with some embodiments. In particular, FIG. 13 depicts a graph of depth values of an example individual grid element in five temporally proximate depth frames, depicted as corresponding with time intervals t1-t5. In some embodiments without limitation, each time interval may be $\frac{1}{10}$ of a second. As shown, the depth value at t3 has exceeded an example threshold depth change between at least one of the t2 depth value and the t4 depth value, and therefore the grid element in depth frame t3 may be determined to be part of a moving occlusion. In some embodiments, detecting a moving occlusion includes analyzing multiple grid elements in proximity to the detected moving occlusion grid element in order to detect a full far occluding object. In some embodiments, the upper limit of the fullness level may have a predetermined change threshold between adjacent depth frames, i.e., if a change of the estimated fullness level exceeds a predetermined limit, it may indicate the presence of a loader, for example. In other words, if a loader is relatively near the depth sensor in a region of the shipping container that hasn't been loaded yet (but not so near to the depth sensor as to cause missing data), there may be a large spike in shipping-container fullness estimation if that transient occlusion were not detected and corrected for.

In some embodiments, the one or more identified occlusions corresponds to an occlusion set of the grid elements in the depth frame, and correcting the one or more occlusions in the depth frame using one or more temporally proximate depth frames includes overwriting the occlusion set in the depth frame with data from corresponding non-occluded grid elements from one or more of the temporally proximate depth frames. In other words, the non-occluded grid elements of the most adjacent depth frame may be used to fill in the occlusion set of grid elements in the current occluded depth frames.

Figure 14A:
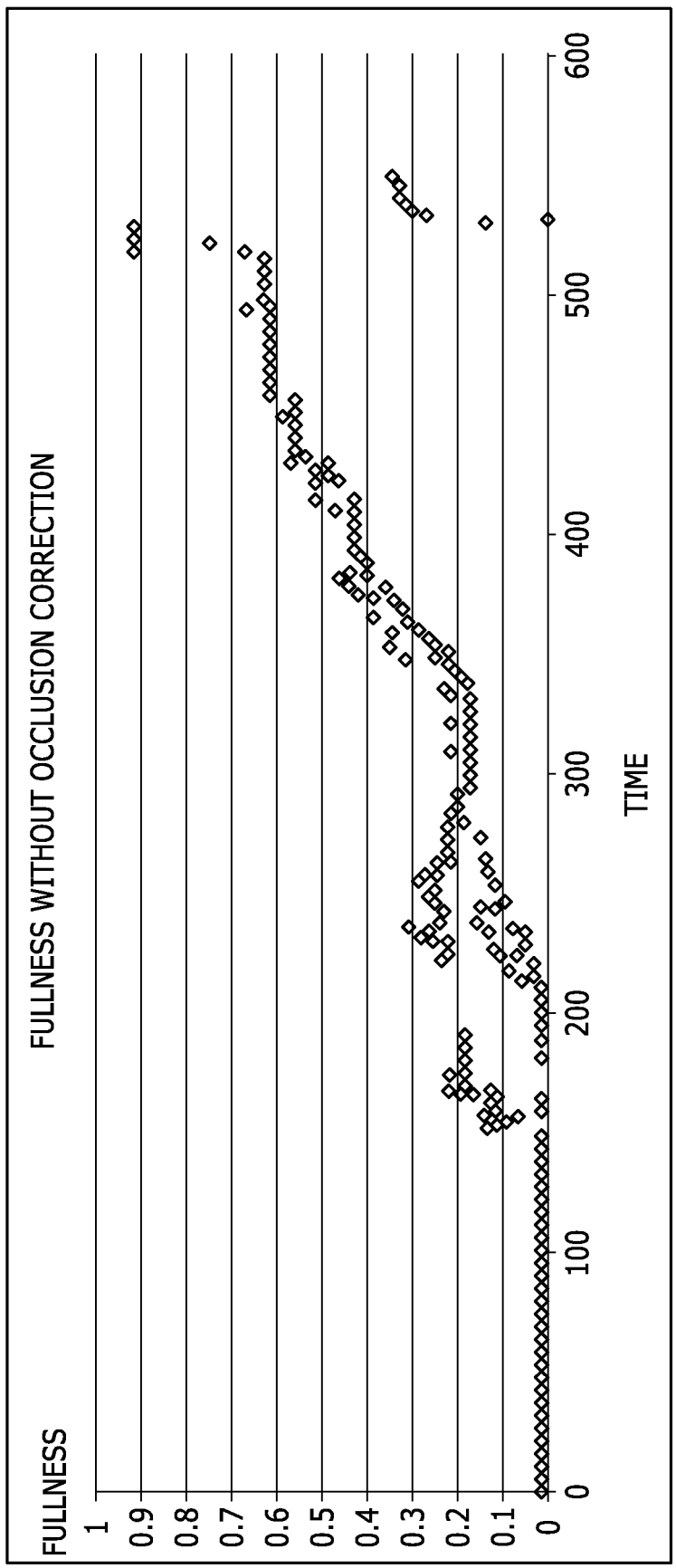
FIGS. 14A and 14B depict examples of graphed container-fullness-estimation results without and with occlusion correction, respectively, in accordance with some embodiments.
Figure 14B:
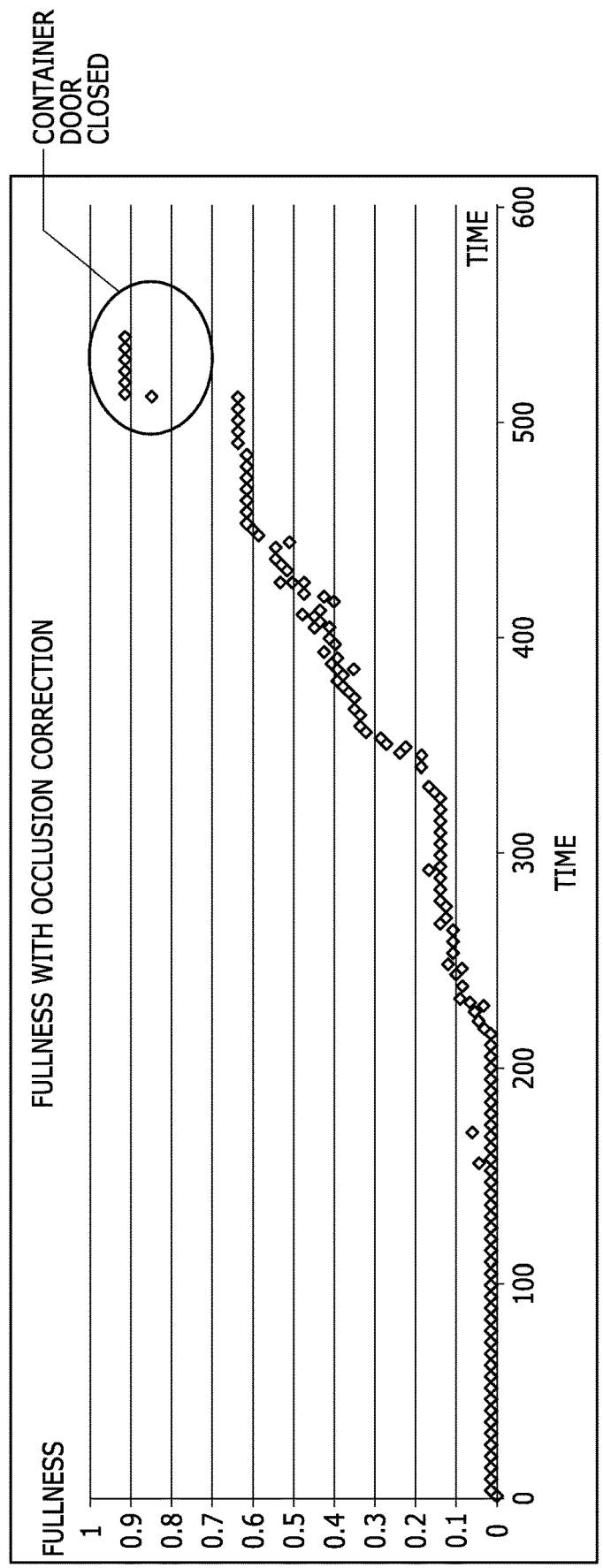

FIGS. 14A and 14B depict examples of shipping-container-fullness estimation without occlusion correction and with occlusion correction, respectively. As shown, the x-axis of FIGS. 14A and 14B represents time, while the y-axis represents the current shipping-container fullness estimation. As shown, FIG. 14A includes results of uncorrected-for occlusions (such as between times ~150-225). Methods described herein detect and correct for these occlusions, and a more accurate shipping-container fullness estimation over time is achieved, as shown by the smoothly increasing curve of FIG. 14B.

All occlusion scenarios cause the loss of valid 3D measurement of the packages occluded by the loaders or other transiting or stationary objects in front of the packages. This yields inaccurate fullness estimation (either under- or overestimation).

This disclosure proposes solutions for these two types of occlusions respectively. In cases of close occlusions (which result in underestimation of container fullness), gaps are detected from the 3D depth data. Several geometric constraints including contour length, aspect ratio of the gaps are used to identify true occlusions. In cases of far occlusions (which result in overestimation of container fullness), clustering and temporal analysis may be used to identify such occlusions.

Container-fullness level needs to be estimated reliably even when occlusions are present. The 3D depth data are corrected based on temporal analysis of multiple loading frames after the occlusions are identified. Specifically, each frame is compared with its adjacent frames, and the occluded areas are "filled" with data from corresponding non-occluded areas from adjacent frames. The fullness level is then estimated from the corrected data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
receiving a depth frame from a depth sensor oriented towards an open end of a shipping container;
performing, using a processor, a first occlusion detection analysis on the depth frame to identify a first type of occlusion occurring at a first depth range;
performing, using the processor, a second occlusion detection analysis on the depth frame to identify a second type of occlusion occurring at a second depth range different than the first depth range;
when one or more occlusions are detected in the depth frame, correcting, using the processor, the one or more occlusions in the depth frame using one or more temporally proximate depth frames; and
outputting the corrected depth frame for fullness estimation, wherein the first type of occlusion includes a moving occlusion, and wherein the first occlusion detection analysis comprises identifying that the depth value associated with one of the grid elements decreases with respect to previous frames and then increases in succeeding frames in less than a threshold amount of time across multiple depth frames.

2. The method of claim 1, wherein the second type of occlusion includes a missing-data occlusion.

3. The method of claim 1, wherein the second occlusion detection analysis comprises:

generating a binarization map delineating between (i) grid elements for which the respective depth value is valid and (ii) grid elements for which the respective depth value is not valid; and identifying an instance of the second type of occlusion the occlusion as a cluster of grid elements in the binarization map for which the respective depth value is not valid.

4. The method of claim 3, wherein identifying the instance of the second type of occlusion comprises confirming that the identified cluster of grid elements exceeds a predetermined occlusion-size threshold.

5. The method of claim 4, wherein identifying the instance of the second type of occlusion further comprises performing edge detection on the cluster of grid elements.

6. The method of claim 5, wherein identifying the instance of the second type of occlusion further comprises performing contour identification on the cluster of grid elements.

7. The method of claim 1, wherein the moving occlusion is associated with a single grid element in the plurality of grid elements.

8. The method of claim 1, wherein the first occlusion detection analysis further comprises identifying a threshold depth change in one of the grid elements between the depth frame and at least one temporally proximate depth frame.

9. The method of claim 1, wherein the first type of occlusion further includes a discontinuous occlusion.

10. The method of claim 9, wherein the first occlusion detection analysis identifying the first type of occlusion comprises:

identifying a cluster of grid elements having a collective depth value;

calculating a difference between the collective depth value and a depth value of a loaded-portion boundary of the shipping container;

comparing the difference to a threshold; and identifying the discontinuous occlusion when the difference is greater than the threshold.

11. The method of claim 10, wherein identifying the discontinuous occlusion further comprises confirming that the identified cluster of grid elements exceeds a predetermined occlusion-size threshold.

12. The method of claim 11, wherein identifying the discontinuous occlusion further comprises performing edge detection on the cluster of grid elements.

13. The method of claim 12, wherein identifying the discontinuous occlusion further comprises performing contour identification on the cluster of grid elements.

14. The method of claim 1, wherein the grid elements are pixels.

15. The method of claim 1, wherein the grid elements are groups of pixels.

16. The method of claim 1, wherein:

the one or more identified occlusions corresponds to an occlusion set of the grid elements in the depth frame; and correcting the one or more occlusions in the depth frame using one or more temporally proximate depth frames comprises overwriting the occlusion set in the depth frame with data from corresponding non-occluded grid elements from one or more of the temporally proximate depth frames.

17. The method of claim 1, further comprising analyzing a buffer of depth frames, wherein the buffer includes the received depth frame.

* * * * *